(12) United States Patent
Jameson

(10) Patent No.: US 9,746,061 B2
(45) Date of Patent: Aug. 29, 2017

(54) DRIVE ASSEMBLY INCLUDING TURBINE SHELL FIXED TO A DAMPER ASSEMBLY BY A RECTANGULAR RIVET

(71) Applicant: Schaeffler Technologies GmbH & Co. KG, Herzogenaurach (DE)

(72) Inventor: Jonathan Jameson, Dalton, OH (US)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 538 days.

(21) Appl. No.: 14/331,123

(22) Filed: Jul. 14, 2014

(65) Prior Publication Data

US 2015/0023795 A1    Jan. 22, 2015

Related U.S. Application Data

(60) Provisional application No. 61/846,891, filed on Jul. 16, 2013.

(51) Int. Cl.
| | |
|---|---|
| *F16H 45/02* | (2006.01) |
| *B21D 39/03* | (2006.01) |
| *B23P 11/00* | (2006.01) |
| *B21J 15/02* | (2006.01) |
| *F16B 5/04* | (2006.01) |

(52) U.S. Cl.
CPC ........... *F16H 45/02* (2013.01); *B21D 39/032* (2013.01); *B21J 15/02* (2013.01); *B23P 11/00* (2013.01); *F16B 5/045* (2013.01); *F16H 2045/0221* (2013.01); *Y10T 29/49956* (2015.01)

(58) Field of Classification Search
None
See application file for complete search history.

(56) References Cited

U.S. PATENT DOCUMENTS

| | | | |
|---|---|---|---|
| 2004/0206593 A1 | 10/2004 | Schmid et al. | |
| 2008/0190723 A1* | 8/2008 | Heck | F16H 41/24 192/3.29 |
| 2011/0226576 A1* | 9/2011 | Feldhaus | F16F 15/1207 192/3.28 |
| 2012/0210558 A1* | 8/2012 | Logan | B23P 11/005 29/527.5 |
| 2013/0283597 A1* | 10/2013 | Denslow | B21J 15/02 29/524.1 |

FOREIGN PATENT DOCUMENTS

DE    2736492 A1 *   8/1977    ......... F16F 15/1295

* cited by examiner

*Primary Examiner* — Jacob S Scott
(74) *Attorney, Agent, or Firm* — Davidson, Davidsn & Kappel, LLC

(57) ABSTRACT

A drive assembly for a torque converter is provided. The drive assembly includes a turbine shell and a damper assembly fixed to the turbine shell by at least one rectangular rivet. A method of forming a drive assembly for a torque converter is also provided. The method includes fixing a turbine shell and a damper assembly together by a plurality of rectangular rivets.

18 Claims, 5 Drawing Sheets

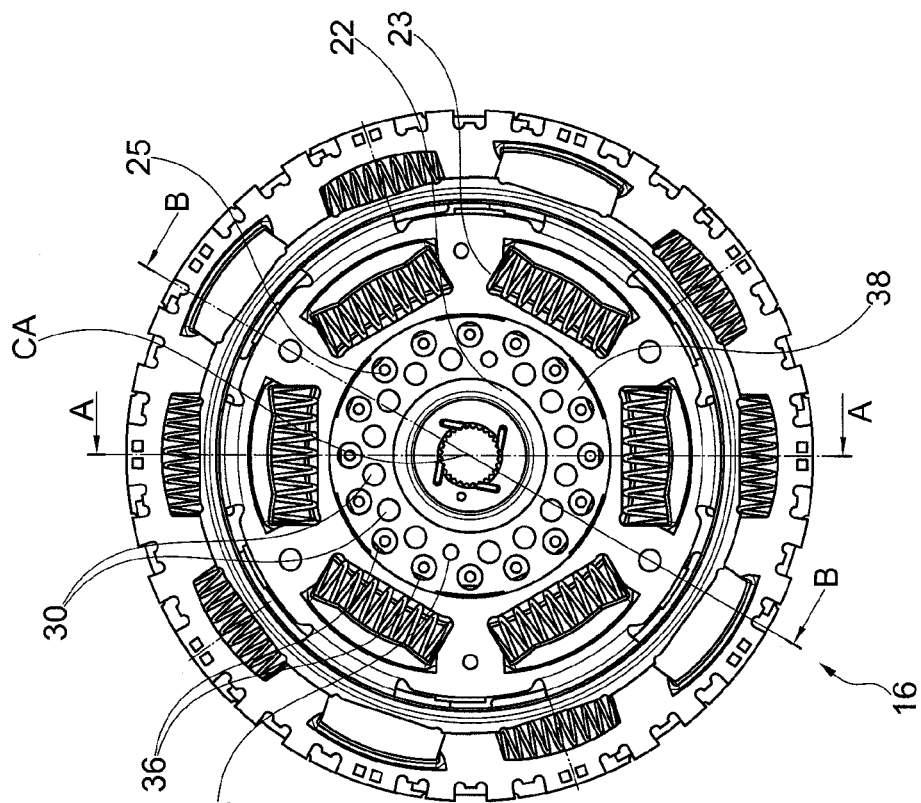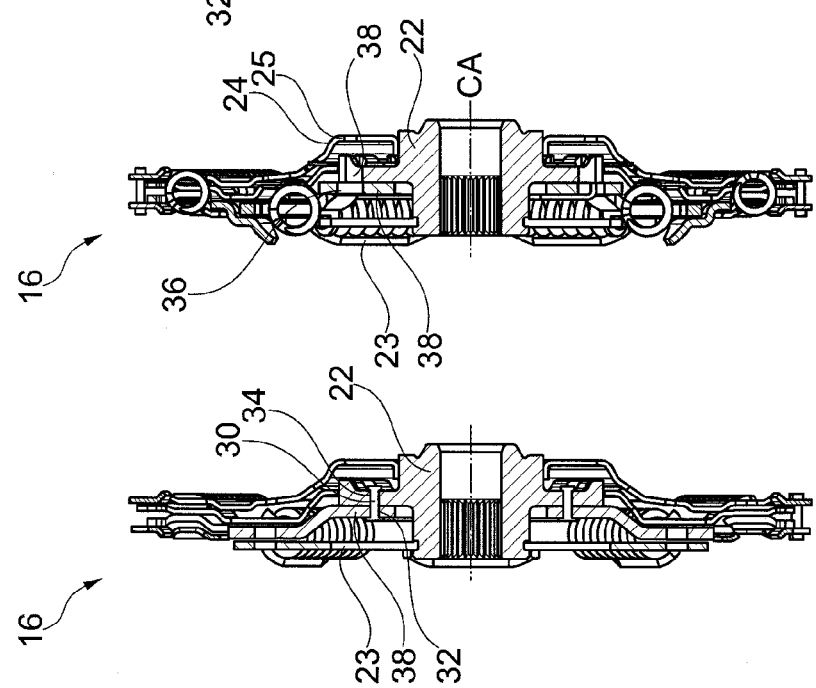
Fig. 1b
Fig. 1c
Fig. 1d

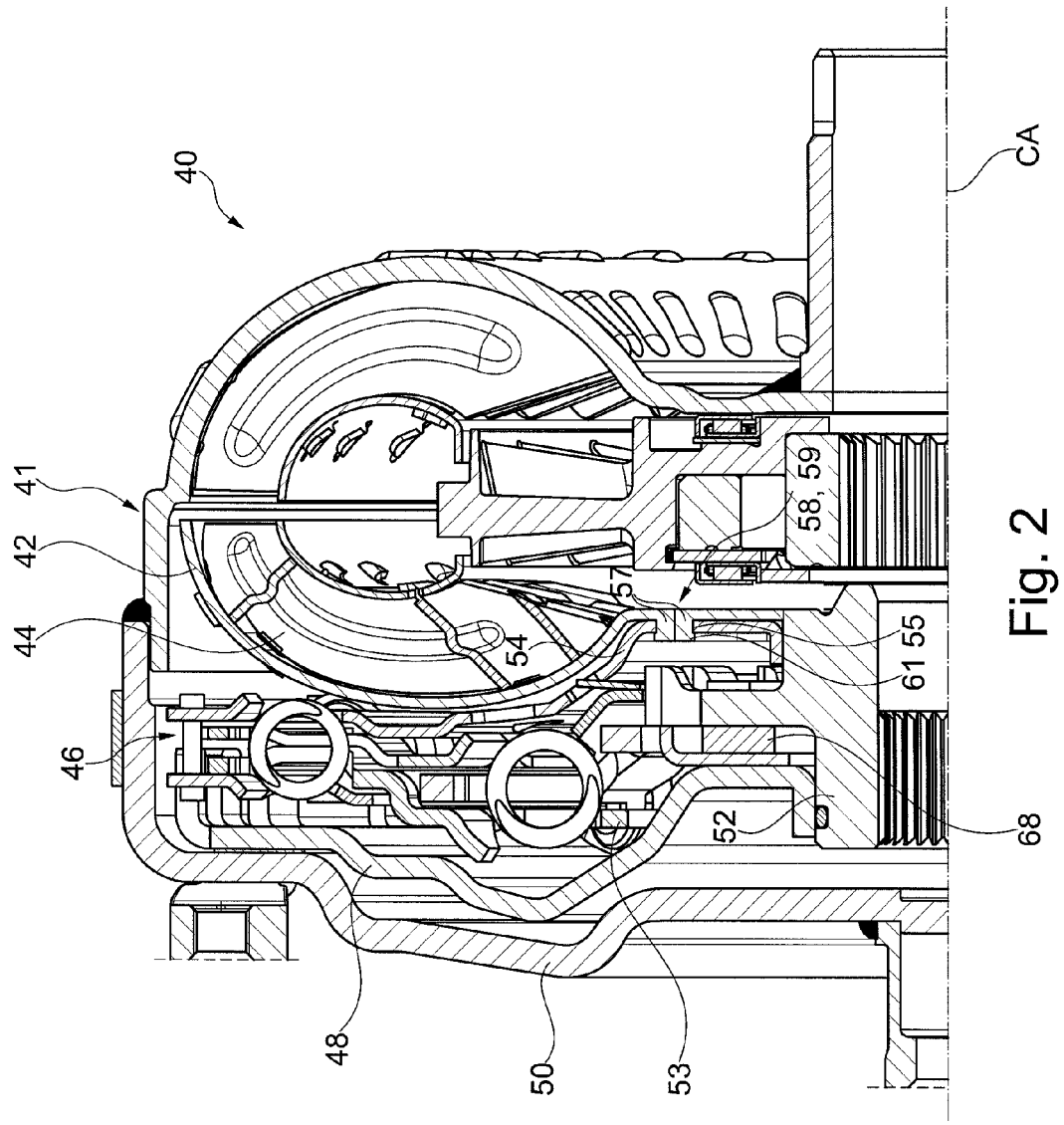

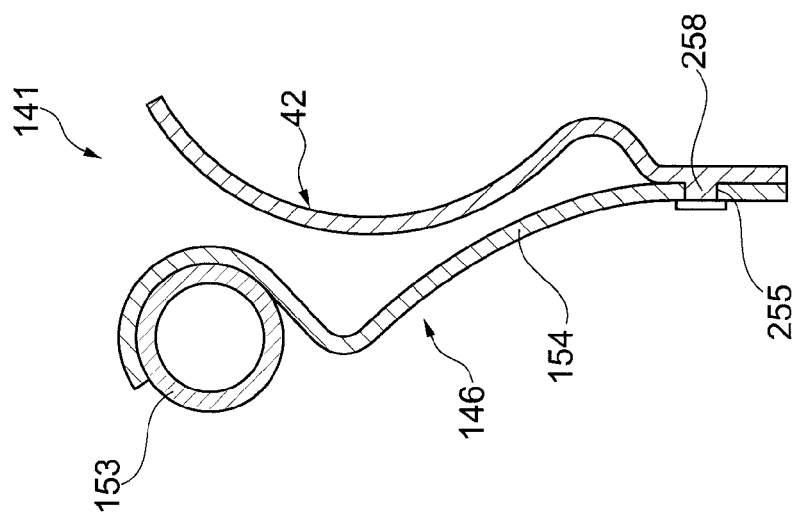
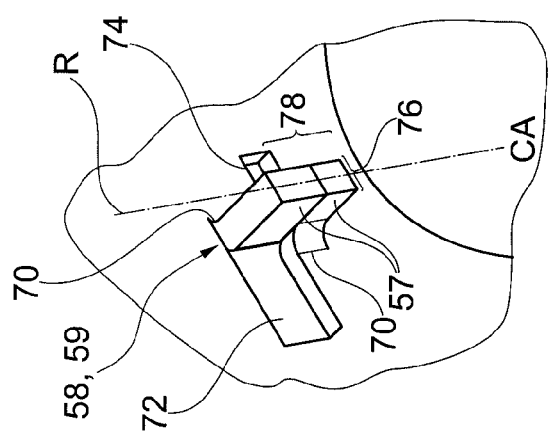
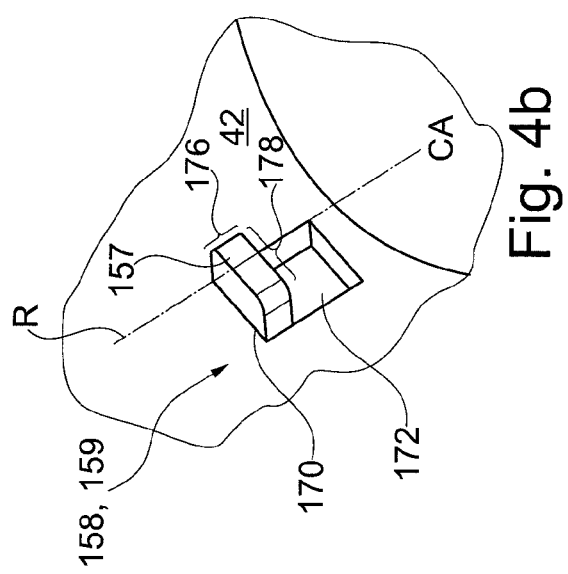
Fig. 5
Fig. 4a
Fig. 4b

US 9,746,061 B2

DRIVE ASSEMBLY INCLUDING TURBINE SHELL FIXED TO A DAMPER ASSEMBLY BY A RECTANGULAR RIVET

This claims the benefit to U.S. Provisional Patent Application No. 61/846,891, filed on Jul. 16, 2013, which is hereby incorporated by reference herein.

The present disclosure relates to drive assemblies of torque converters, and more particularly to riveting components to turbine shells of torque converters.

BACKGROUND

U.S. Publication No. 2004/0206593 discloses an intermediate element fixed to a turbine shell by a conventional round rivet.

FIG. 1a shows cross-sectional side view of a torque converter 10 including a turbine shell 12 supporting a plurality of turbine blades 14. Torque converter 10 also includes a damper assembly 16 provided between a piston 18 and turbine shell 12 rotationally coupling piston 18 and turbine shell 12 together. Piston 18 is axially slidable to engage a front cover 20 to rotationally couple turbine shell 12 to front cover 20. Damper assembly 16 includes a rotatable damper hub 22, a front cover plate 23 and a rear cover plate 24 that is riveted to turbine shell 12 and a turbine hub flange 26 by a plurality of round rivets 28 that pass through respective holes 25, 27, 29 in cover plate 24, turbine shell 12 and flange 26.

FIG. 1b shows a plan view of damper assembly 16 shown in FIG. 1a. FIG. 1c shows a cross-sectional view of damper assembly 16 taken along A-A in FIG. 1b and FIG. 1d shows a cross-sectional view of damper assembly 16 taken along B-B in FIG. 1b. A connection flange 38 of damper assembly 16 is fixed to damper hub 22 by a plurality of round rivets 30 spaced circumferentially about a center axis CA of torque converter 10 and damper assembly 16. Rivets 30 pass through corresponding holes 32 formed in connection flange 38 (two of which are shown unfilled by rivets 30 in FIG. 1b) and corresponding holes 34 formed in damper hub 22. Connection flange 38 also includes a plurality of holes 36 that are radially offset from holes 32. Holes 36 are aligned with respective holes 25, 27, 29 in cover plate 24, turbine shell 12 and flange 26 so that a riveting tool may be inserted through holes 36 (and corresponding holes 38 in damper hub 22) to install rivets 28 in holes 25, 27, 29 and connect cover plate 24 to turbine shell 12 and turbine hub flange 26.

SUMMARY OF THE INVENTION

A drive assembly for a torque converter is provided. The drive assembly includes a turbine shell and a damper assembly fixed to the turbine shell by at least one rectangular rivet.

Embodiments of the torque converter may also include one or more of the following advantageous features:

The damper assembly may include a spring retainer fixed to the turbine shell by the at least one rectangular rivet. The damper assembly may include a cover plate fixed to the turbine shell by the at least one rectangular rivet. The damper assembly may include a connection flange and a damper hub riveted together by a plurality of additional rivets. The damper assembly may include rectangular holes formed therein. The additional rivets may be radially aligned with the rectangular holes. Each of the rectangular holes may be circumferentially between two of the additional rivets. The at least one rectangular rivet may be formed from the turbine shell. The at least one rectangular rivet may be formed by a bent tab having at least one bend extending perpendicular to a radii of the turbine shell. The at least one rectangular rivet may be formed by a bent tab having at least one bend extending parallel to a radii of the turbine shell. The rectangular rivet may be formed by a bent tab having a first tab portion formed to define a first hole on a first side of the bent tab and a second tab portion formed to define a second hole on a second side of the bent tab opposite the first tab portion. The at least one rectangular rivet may be formed by a bent tab having a narrower side and a wider side oriented with respect to a center axis of the turbine shell such that the wider side is parallel to a radii of the turbine shell and narrower side is perpendicular to the radii.

A method of forming a drive assembly for a torque converter is also provided. The method includes fixing a turbine shell and a damper assembly together by a plurality of rectangular rivets.

Embodiments of the method may also include one or more of the following advantageous features:

The method may further include fixing a damper hub and a connection flange of the damper assembly together by a plurality of additional rivets. The damper assembly may include rectangular holes formed therein. The additional rivets may be radially aligned with the rectangular holes. The damper assembly may include a spring retainer and the fixing may include fixing the spring retainer and the turbine shell together by the rectangular rivets. The damper assembly may include a cover plate and the fixing may include fixing the cover plate and the turbine shell together by the rectangular rivets. The fixing the turbine shell to the damper assembly may further include forming a plurality bent tabs in the turbine shell. The fixing the turbine shell to the damper assembly may further include inserting each of the bent tabs through a corresponding hole in the further component. The fixing the turbine shell to the further component further may include stamping the bent tabs to fix the damper assembly and turbine shell together by the rectangular rivets. Each of the bent tabs may have a bend extending perpendicular to a radii of the turbine shell. Each of the bent tabs may have a bend extending parallel to a radii of the turbine shell.

BRIEF DESCRIPTION OF THE DRAWINGS

The present invention is described below by reference to the following drawings, in which:

FIGS. 1a to 1d show a torque converter including a damper assembly and a turbine shell connected by round rivets;

FIG. 2 shows a cross-sectional view of a torque converter including a drive assembly in accordance with an embodiment of the present invention;

FIG. 4a shows a perspective view of a bent tab used to form one of rivets of the drive assembly shown in FIG. 2 in accordance with an embodiment of the present invention;

FIG. 4b shows a perspective view of a bent tab used to form a rivet in accordance with another embodiment of the present invention; and FIG. 5 shows a cross-sectional view of a drive assembly for a torque converter in accordance with another embodiment of the present invention.

DETAILED DESCRIPTION

Figure 1A:
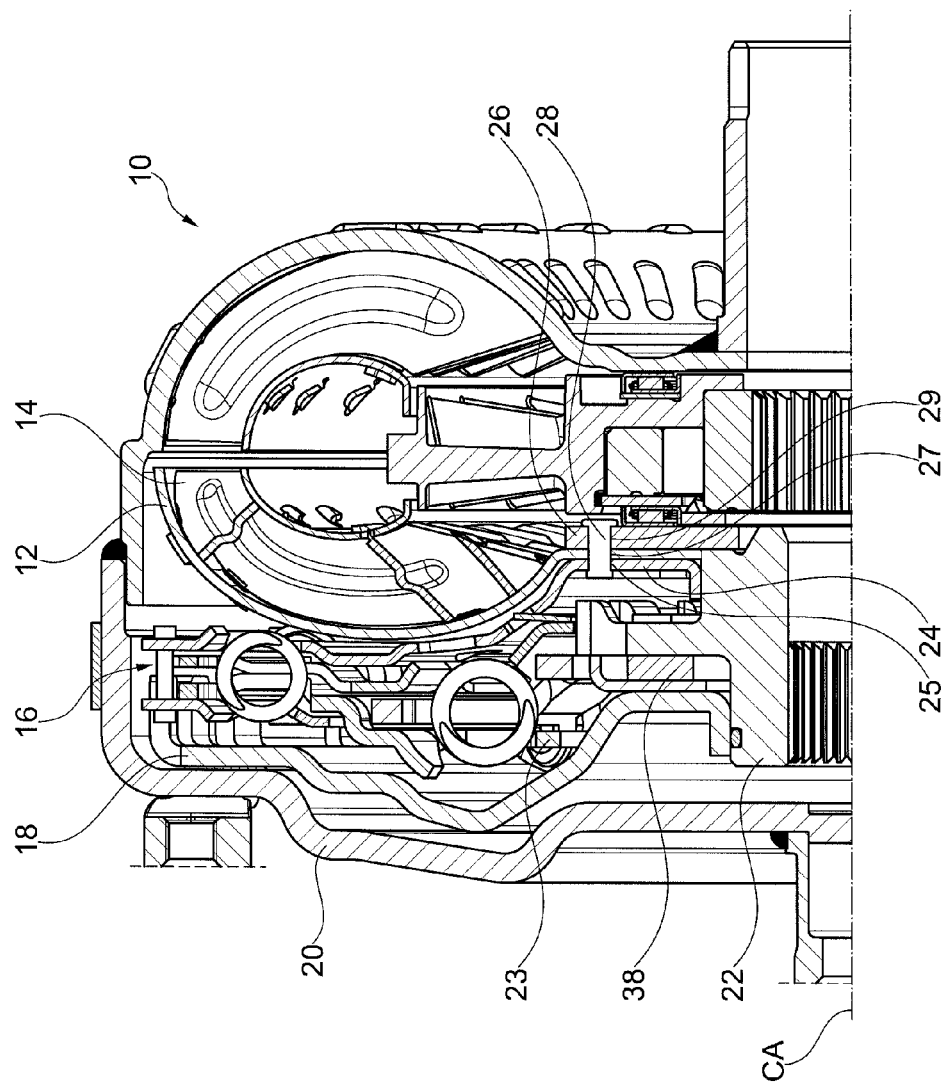

FIG. 2 shows a cross-sectional view of a torque converter 40 including a drive assembly 41 in accordance with an embodiment of the present invention. Drive assembly 41 includes a turbine shell 42 supporting a plurality of turbine blades 44. Drive assembly 41 also includes a damper assembly 46 provided between a piston 48 and turbine shell 42 rotationally coupling piston 48 and turbine shell 42 together. Piston 48 is axially slidable to engage a front cover 50 to rotationally couple turbine shell 42 to front cover 50. Damper assembly 46 includes a rotatable damper hub 52, a front cover plate 53 and a rear cover plate 54 that is riveted to turbine shell 42 by a plurality of rectangular rivets 58 that pass through rectangular holes 55 in cover plate 54. Rectangular rivets 58 may each be formed from turbine shell 42 by cutting at least one tab portion 57 in turbine shell 42 and bending the at least one tab portion 57 perpendicular to the plane the at least one tab portion 57 was cut from so as to form a tab 59 insertable through the corresponding hole 55 in cover plate 54. Tab 59 is then stamped with a rivet tool to form a rivet head 61. In the embodiment shown in FIG. 2, rivets 58 are each formed by two tab portions 57, which are radially aligned with each other such that one tab portion 57 is radially outside of the other tab portion 57.

Figure 3:
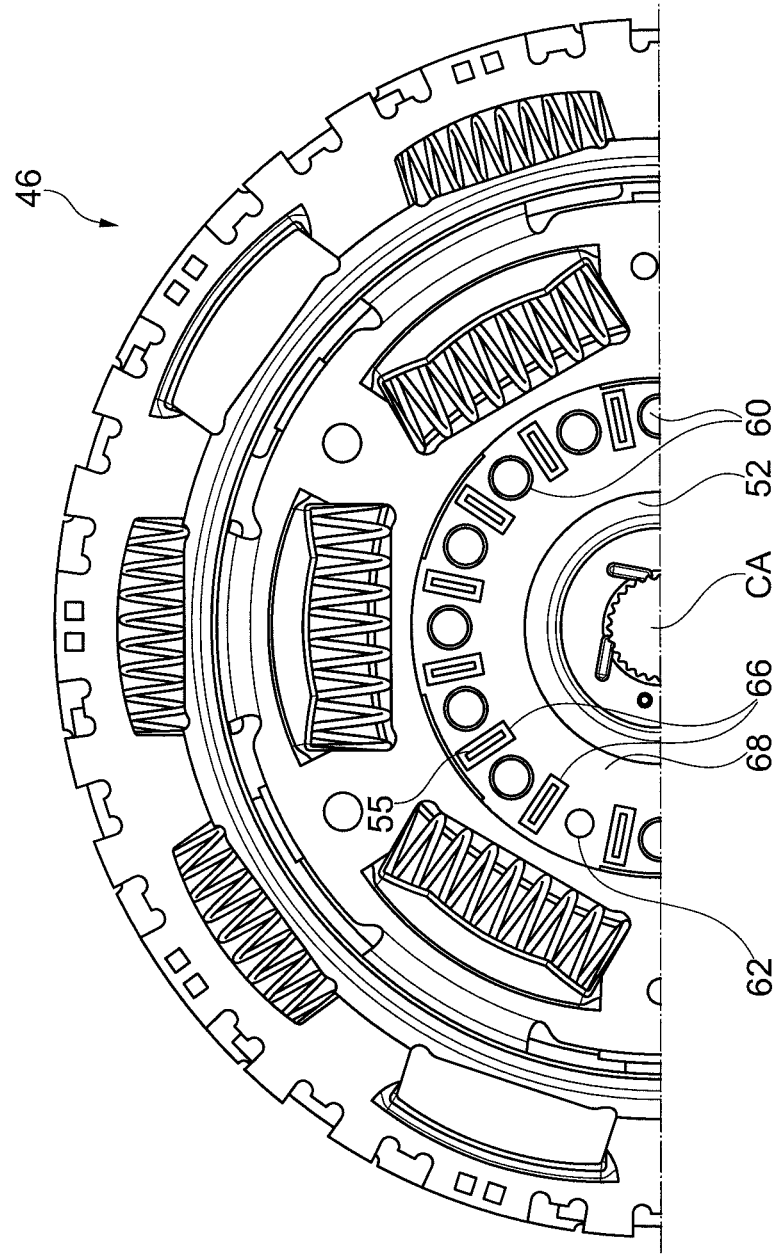
FIG. 3 shows a plan view of a damper assembly of the drive assembly shown in FIG. 2.

FIG. 3 shows a plan view of half of damper assembly 46 shown in FIG. 2. A connection flange 68 of damper assembly 46 is fixed to damper hub 52 by a plurality of round rivets 60 spaced circumferentially about a center axis CA of torque converter 40 and damper assembly 46. Rivets 60 pass through corresponding holes 62 formed in connection flange 68 (one of which is shown unfilled by a rivet 60 in FIG. 3) and corresponding holes formed in damper hub 52. Connection flange 68 also includes a plurality of rectangular holes 66 that are radially aligned with holes 62 and rivets 60. Holes 66 are axially aligned with corresponding rectangular holes 55 in cover plate 54 so that a riveting tool may be inserted through holes 66 (and corresponding holes 68 in damper hub 52) to stamp tabs 59 passing through holes 55 to form rivet heads 61 so rivets 58 connect cover plate 54 to turbine shell 42. As shown by the comparison of damper assembly 16 in FIG. 1b and damper assembly 46 in FIG. 3, using rectangular rivets 58 in place of round rivets 28 allows for holes for receiving damper hub rivets and holes for receiving turbine shell rivets to be radially aligned, resulting in a space savings at the damper assembly.

FIG. 4a shows a perspective view of a bent tab 59 used to form one of rivets 58 shown in FIG. 2 in accordance with an embodiment of the present invention. Bent tab 59 is formed from two tab portions 57, which are each cut from turbine shell 42 and bent along respective bends 70 to extend perpendicular to the plane of the portion of turbine shell 42 from which tab portions 57 were cut, leaving holes 72, 74 behind in turbine shell 42. In this embodiment, holes 72, 74 are formed on opposite sides of a radii R passing from center axis CA and tab portions 57 are bent away from holes 73, 74 toward each other to align at radii R. Bends 70 each extend parallel to radii R. Bent tab 59 has a narrower side 76 and a wider side 78 and is oriented with respect to center axis CA such that wider side 78 is parallel to radii R and narrower side 76 is perpendicular to radii R.

FIG. 4b shows a perspective view of a bent tab 159 used to form a rivet 158 in accordance with another embodiment of the present invention. Bent tab 159 is formed by a single tab portion 157. Tab portion 157 is formed from turbine shell 42 and bent along a bend 170 to extend perpendicular to the plane of the portion of turbine shell 42 from which tab 159 was cut, leaving a hole 172 behind in turbine shell 42. Bend 170 extends perpendicular to radii R. In this embodiment, rivet 158 has a narrower side 176 and a wider side 178 and is oriented with respect to center axis CA such that wider side 178 is perpendicular to radii R and narrower side 176 is parallel to radii R.

FIG. 5 shows a cross-sectional view of a drive assembly 141 for a torque converter in accordance with another embodiment of the present invention. Drive assembly 141 includes a damper assembly 146 including a spring retainer 154 retaining a plurality of arc springs 153 by wrapping around an outer circumference of each of the arc springs 153. Near the inner radial ends thereof, turbine shell 42 and spring retainer 154 are fixed together by rectangular rivets 258, which are formed from material of turbine shell 42 and passed through corresponding rectangular holes 255 in spring retainer 154.

In the preceding specification, the invention has been described with reference to specific exemplary embodiments and examples thereof. It will, however, be evident that various modifications and changes may be made thereto without departing from the broader spirit and scope of invention as set forth in the claims that follow. The specification and drawings are accordingly to be regarded in an illustrative manner rather than a restrictive sense.

What is claimed is:

1. A drive assembly of a torque converter comprising:
    a turbine shell; and
    a damper assembly fixed to the turbine shell by at least one rectangular rivet, each rectangular rivet being formed from the turbine shell and including a stamped head holding a portion of the damper assembly against a surface of the turbine shell.

2. The drive assembly as recited in claim 1 wherein the damper assembly includes a spring retainer, the spring retainer being fixed to the turbine shell by the at least one rectangular rivet.

3. The drive assembly as recited in claim 1 wherein the damper assembly includes a cover plate, the cover plate being fixed to the turbine shell by the at least one rectangular rivet.

4. The drive assembly as recited in claim 1 wherein the damper assembly includes a connection flange and a damper hub riveted together by a plurality of additional rivets, the damper assembly including rectangular holes formed therein, the additional rivets being radially aligned with rectangular holes.

5. The drive assembly as recited in claim 4 wherein each of the rectangular holes is circumferentially between two of the additional rivets.

6. The drive assembly as recited in claim 1 wherein the rectangular rivet is formed by a bent tab having at least one bend extending perpendicular to a radii of the turbine shell.

7. The drive assembly as recited in claim 1 wherein the rectangular rivet is formed by a bent tab having at least one bend extending parallel to a radii of the turbine shell.

8. The drive assembly as recited in claim 1 wherein the rectangular rivet is formed by a bent tab having a first tab portion formed to define a first hole on a first side of the bent tab and a second tab portion formed to define a second hole on a second side of the bent tab opposite the first tab portion.

9. The drive assembly as recited in claim 1 wherein the rectangular rivet is formed by a bent tab having a narrower side and a wider side and is oriented with respect to a center axis of the turbine shell such that the wider side is parallel to a radii of the turbine shell and narrower side is perpendicular to the radii.

10. A torque converter comprising the drive assembly as recited in claim 1.

11. A method of forming a drive assembly for a torque converter comprising:

fixing a turbine shell and a damper assembly together by a plurality of rectangular rivets, the fixing including bending tabs out of the turbine shell to extend perpendicular to a surface of the turbine shell surrounding each respective tab and then stamping a free end of each tab to form a rivet head to fix the turbine shell and the damper assembly together, holes being left in the turbine shell from the bending of the tabs.

12. The drive assembly as recited in claim 11 wherein the damper assembly includes a spring retainer, the fixing including fixing the spring retainer to the turbine shell by the rectangular rivets.

13. The drive assembly as recited in claim 11 wherein the damper assembly includes a cover plate, the fixing including fixing the cover plate to the turbine shell by the rectangular rivets.

14. The method as recited in claim 11 further comprising fixing a damper hub and a connection flange of the damper assembly together by a plurality of additional rivets, the damper assembly including rectangular holes formed therein, the additional rivets being radially aligned with the rectangular holes.

15. The method as recited in claim 11 wherein the fixing the turbine shell to the damper assembly further includes inserting each of the bent tabs through a corresponding hole in the damper assembly.

16. The method as recited in claim 11 wherein each of the bent tabs has a bend extending perpendicular to a radii of the turbine shell.

17. The method as recited in claim 11 wherein each of the bent tabs has a bend extending parallel to a radii of the turbine shell.

18. A drive assembly of a torque converter comprising:
a turbine shell; and
a damper assembly fixed to the turbine shell by at least one rectangular rivet, the damper assembly including a connection flange and a damper hub riveted together by a plurality of additional rivets, the damper assembly including rectangular holes formed therein, the additional rivets being radially aligned with rectangular holes, each of the rectangular holes being circumferentially between two of the additional rivets, each of the rectangular holes extending longitudinally radially away from a center axis of the drive assembly.

* * * * *